US010757574B1

(12) United States Patent
Rule et al.

(10) Patent No.: US 10,757,574 B1
(45) Date of Patent: Aug. 25, 2020

(54) MULTI-FACTOR AUTHENTICATION PROVIDING A CREDENTIAL VIA A CONTACTLESS CARD FOR SECURE MESSAGING

(71) Applicant: Capital One Services, LLC, McLean, VA (US)

(72) Inventors: Jeffrey Rule, Chevy Chase, MD (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/727,162

(22) Filed: Dec. 26, 2019

(51) Int. Cl.
*H04W 12/06* (2009.01)
*H04L 29/06* (2006.01)
*H04L 9/32* (2006.01)
*H04W 4/14* (2009.01)
*G06Q 20/32* (2012.01)

(52) U.S. Cl.
CPC ........ *H04W 12/06* (2013.01); *G06Q 20/3278* (2013.01); *H04L 9/3228* (2013.01); *H04L 63/0838* (2013.01); *H04W 4/14* (2013.01)

(58) Field of Classification Search
CPC .. G06Q 20/3829; H04W 12/02; H04L 63/105
USPC ................ 705/71, 44, 26.1, 35, 26.8, 14.27; 703/189; 380/270; 340/5.61, 5.6; 713/168, 183
See application file for complete search history.

(56) References Cited

U.S. PATENT DOCUMENTS

| 4,683,553 | A | 7/1987 | Mollier |
| 4,827,113 | A | 5/1989 | Rikuna |
| 4,910,773 | A | 3/1990 | Hazard et al. |
| 5,036,461 | A | 7/1991 | Elliott et al. |

(Continued)

FOREIGN PATENT DOCUMENTS

| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Kiet M Doan

(57) ABSTRACT

Exemplary embodiments may use a contactless card as a secondary form of authentication in a multi-factor authentication for a secure messaging service. The recipient party of a request to initiate a messaging service session (such as a server computing device) may be programmed to use the phone number of the originating device to look up records regarding an identity of a party and their associated phone number as a primary credential and then may require an authentication credential originating from the contactless card as a secondary credential for the initiating party. In some instances, the credential originating from the contactless card is a onetime password that is valid only for a period of time. The recipient party determines whether the onetime password is valid. If both credentials are valid, a secure messaging session may be initiated with the initiating party.

13 Claims, 13 Drawing Sheets

(56) References Cited

U.S. PATENT DOCUMENTS

| | | |
|---|---|---|
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B2 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |

(56) References Cited

U.S. PATENT DOCUMENTS

| | | |
|---|---|---|
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |

(56) References Cited

U.S. PATENT DOCUMENTS

| | | |
|---|---|---|
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0115341 A1* | 4/2014 | Robertson ............. H04L 9/3228 713/183 |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |

(56) References Cited

U.S. PATENT DOCUMENTS

| | | |
|---|---|---|
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0181014 A1* | 6/2015 | Gerhardt ............ H04L 63/0428 455/420 |
| 2015/0186871 A1 | 7/2015 | Laracey |
| 2015/0205379 A1 | 7/2015 | Mag et al. |
| 2015/0220914 A1* | 8/2015 | Purves ............... G06Q 30/0633 705/26.8 |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://

(56) References Cited

OTHER PUBLICATIONS www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Plafform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://supportapple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 101145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

* cited by examiner

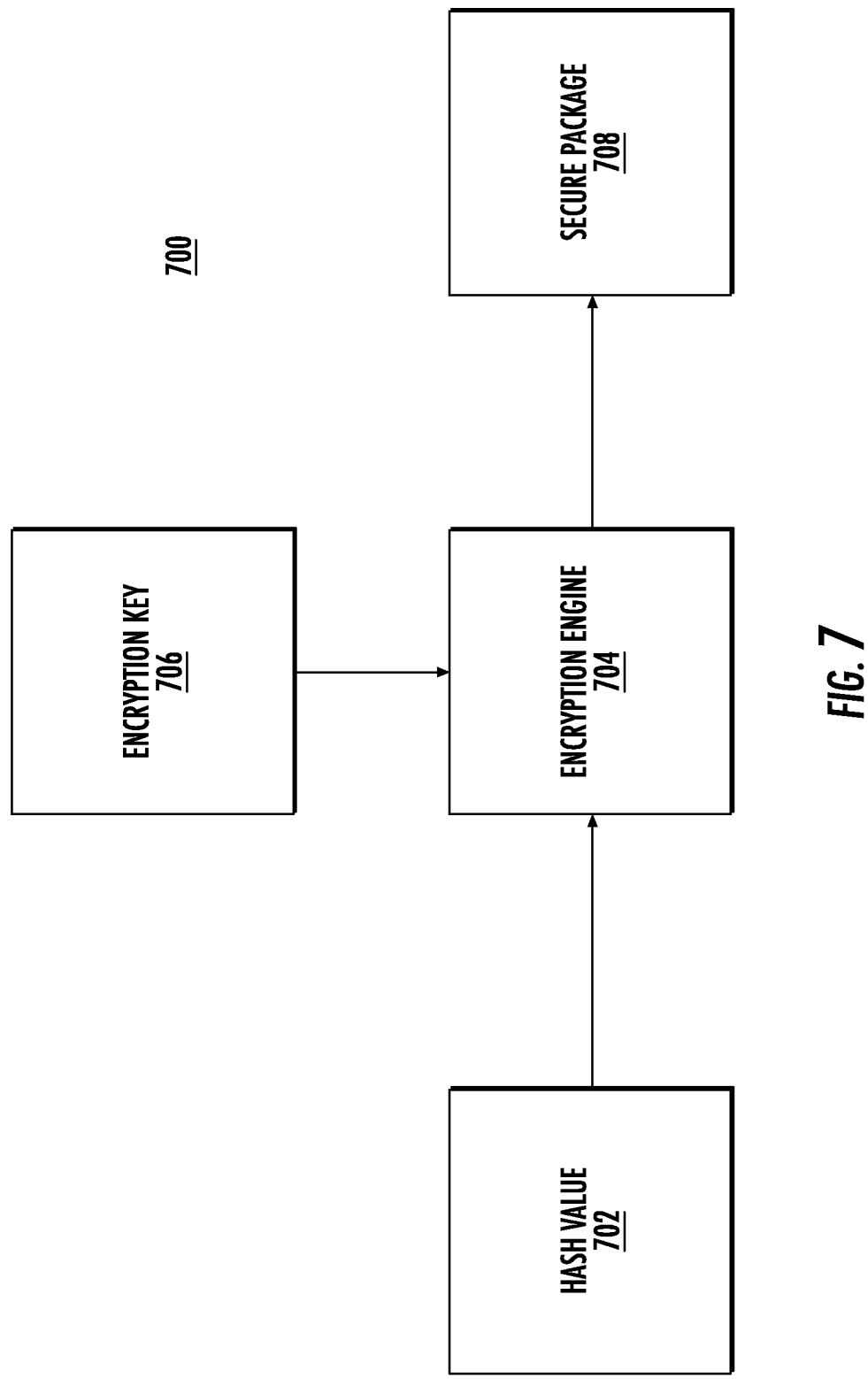

MULTI-FACTOR AUTHENTICATION PROVIDING A CREDENTIAL VIA A CONTACTLESS CARD FOR SECURE MESSAGING

BACKGROUND

Messaging services enable parties to communicate via written messages in a quick and convenient fashion. Messaging services have become increasingly used in business contexts. For example, customers may be able to have a messaging service session with a customer service representative of a company. One limitation of conventional messaging services is the lack of security. A party to a messaging service session may be able to spoof a phone number or assume a false identity in conventional messaging services sessions. As such, it is difficult to transmit potentially sensitive information, such as confidential information via conventional messaging services without fear of communicating with an imposter.

SUMMARY

In accordance with an exemplary embodiment, a computing device implemented method is performed. Per this method, a message is received at a computing device from a Short Message Service (SMS) capable device having an associated phone number. The message indicates a desire to initiate an SMS session, and the message includes a secure component. The secure component is decrypted to obtain a hash of at least a onetime password and an account identifier. The onetime password and the account identifier are extracted. A determination is made whether the onetime password is valid. The account associated with the account identifier is determined, and a phone number connected with the determined account is determined. A determination is made whether the associated phone number is a matching phone number that matches the phone number connected with the account. Where the password is valid and the associated phone number is a matching phone number, a secure SMS session is initiated by sending an SMS message to the SMS capable device. Where the password is not valid and/or the associated password is not a matching phone number, the initiation of the secure SMS session with the SMS capable device is rejected.

The decrypting may use a symmetric decryption algorithm. The method may include the additional steps of checking a geolocation of the SMS-capable device and using the geolocation as another authentication factor in determining whether or not to initiate the secure SMS session. The receiving the message may comprise receiving an SMS message. The onetime password may be a time-based password. The computing device may maintain a counter and may use a value of the counter in determining whether the password has expired. The counter maintained by the computing device may be in synch with a counter maintained by the contactless card.

In accordance with an exemplary embodiment, a Short Message Service (SMS) capable device-implemented method is performed. Per this method, a cryptographically secure onetime password is received from a contactless card at the SMS capable device via a near field communication. The cryptographically secure onetime password comprises an encrypted hash of at least the onetime password and an account identifier. The onetime password is encrypted by a symmetric encryption algorithm, and the onetime password is valid for only a set period of time. A message is sent from the SMS capable device to a party to request initiation of a secure SMS session, wherein the message includes the cryptographically secure onetime password and wherein the SMS capable device has an associated phone number. Where the password is valid and where the phone number of the SMS capable device is associated with an account identified by the account identifier, an SMS message is received from the party at the SMS capable device. Where the secure SMS session is initiated, a chatbot may be used to participate in the secure SMS session.

The sending of the message from the SMS capable device may comprise sending an initial SMS message. The sending of the message from the SMS capable device may comprise one of sending the message to a website for the party or sending the message directly to the party. The method may further include sending geolocation information from the SMS capable device to the party. The SMS message may be received from a chatbot.

In accordance with an exemplary embodiment, a method is performed by a contactless card. Per this method a near field communication (NFC) session is initiated with a computing device. As part of the NFC session, the contactless card communicates with an application program running on the computing device and at least a onetime password and an account identifier are passed through a hash function to create a hash value. The hash value is encrypted. The encrypted hash value is passed to the application running on the computing device. The application is prompted to send a message to a remote computing device to initiate a messaging session with the remote computing device where the message includes the encrypted hash value as evidence of an identity of a party that wishes to initiate the messaging session.

The onetime password may be a time-based password. The contactless card may maintain a counter, and a value of the counter may be used in creating the encrypted hash value. The value of the counter may be passed through the hash function. In some instances, the value of the counter may be passed through the hash function along with the onetime password and the account identifier. The onetime password may be valid only for a set period of time. The NFC session may be initiated responsive to tapping the contactless card on a card reader in the computing device.

BRIEF DESCRIPTION OF THE DRAWINGS

FIG. 7 depicts an encryption operation to produce a secure package.

DETAILED DESCRIPTION

Figure 1:
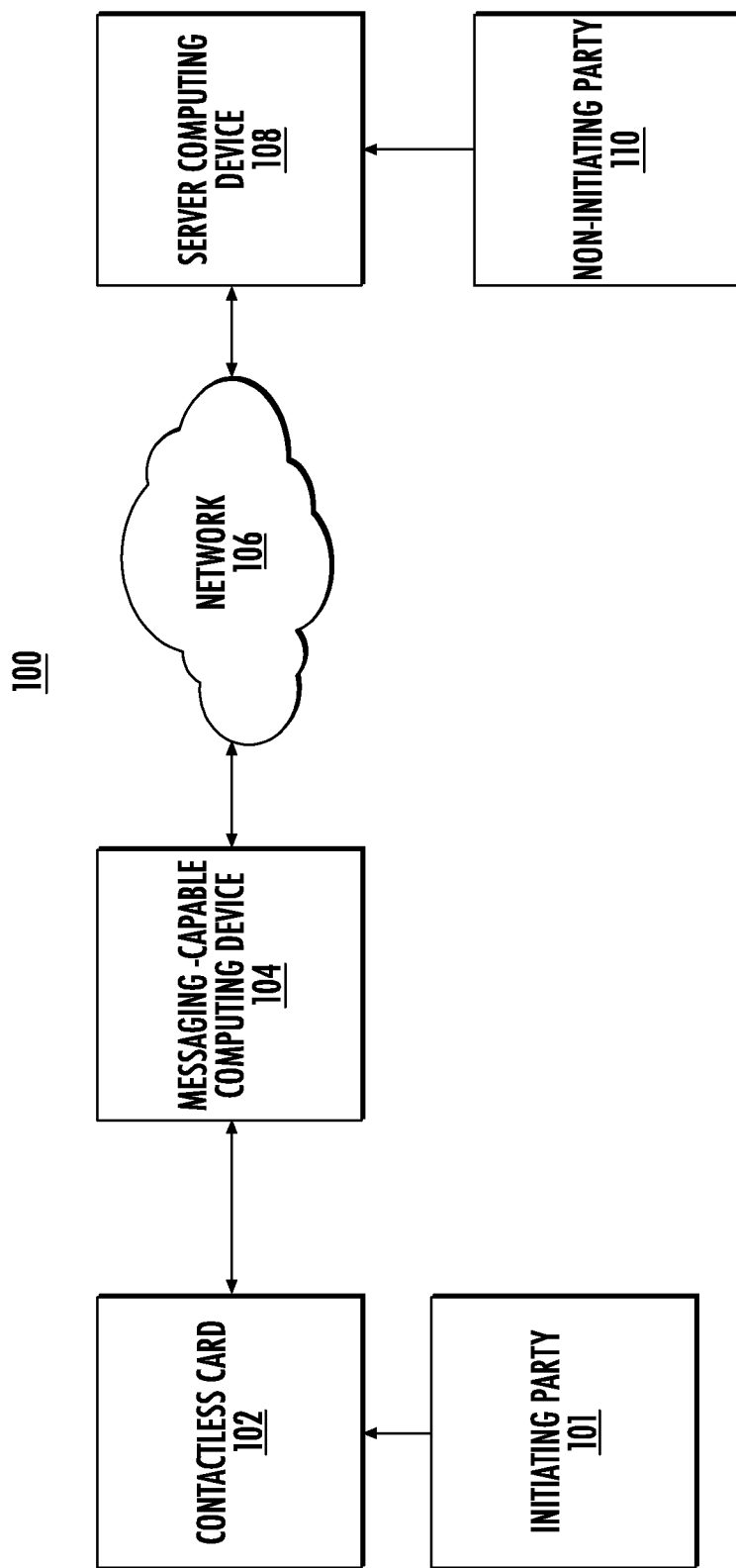
FIG. 1 depicts an environment suitable for practicing exemplary embodiments.

Exemplary embodiments may use a contactless card as a secondary form of authentication in a multi-factor authentication for a secure messaging service. Where messages for the secure messaging service originate from a device having an associated phone number, the phone number may serve as a primary credential of identity for authentication by the messaging service recipient party. The recipient party of a request to initiate a messaging service session (such as a server computing device) may be programmed to use the phone number of the originating device to look up records regarding an identity of a party and their associated phone number as a primary credential and then may require an authentication credential originating from the contactless card as a secondary credential for the initiating party. In some instances, the credential originating from the contactless card is a onetime password that is valid only for a period of time. The recipient party determines whether the onetime password is valid. If both credentials are valid, a secure messaging session may be initiated with the initiating party.

The messaging service may take different forms. For example, the messaging service may be a short message service (SMS) service. The messaging service instead may be an instant messaging service, a social media messaging service, a video messaging service, a chat application or a virtual assistant application, etc.

Since the messaging service described herein may use multi-factor authentication of the initiating party for a messaging service session, the confidence of the non-initiating party involved in the messaging session that the communications are occurring with an authenticated party is enhanced. As such, the risk of an imposter participating in the messaging service session is greatly reduced. Hence, the secure messaging service disclosed herein is well-suited for exchange of potentially sensitive information, such as financial information, health information, business information, driving records, criminal records and other types of confidential information. The secure messaging service described herein is well suited for exchanges between customers and financial institution representatives, patients and healthcare providers, insured and insurance company representatives, clients and lawyers, clients and accountants and fellow corporate employees, etc. Encryption and secure hashing may be used to secure the content of messages that exchanged via the secure messaging service.

The onetime password may be encrypted as part of a secure package that is passed from the initiating party that initiates the secure messaging session to the recipient party. The secure package may hold identifying information, such as account information, for the initiating party. The onetime password may be hashed with a counter value before being added to the package and encrypted. The counter serves as a temporal indicator and helps to define the lifespan of the password.

As part of authentication, the recipient party decrypts the secure package. The recipient party may maintain its own counter value that is synched with the counter value maintained by the initiating party. If the counter value used by the initiating party in the secure package and the counter value maintained by the recipient do not match or differ too greatly in value, it may be an indication that the onetime password is no longer valid. The recipient party checks whether the onetime password is correct. In addition, the recipient party may use the account information to retrieve a phone number for the party associated with the account. The recipient party may check whether the retrieved phone number matches the phone number of the device from which the request originated. If the phone numbers match and the onetime password is correct and not expired, the recipient may initiate the messaging service by prompting a non-initiating party to send a message to the initiating party. The non-initiating party may be a person or a chatbot and may communicate either via the server or via separate client device. If the initiating party fails the authentication, either no message may be sent from the non-initiating party or a rejection message may be sent from the non-initiating party.

FIG. 1 depicts an environment 100 suitable for practicing an exemplary embodiment. The environment includes a contactless card 102 issued from an issuer to the initiating party 101. The initiating party 101 is in possession of the contactless card 102 and is advised to keep the contactless card 102 safe and in their possession given that the contactless card may produce a credential for authenticating identity of the initiating party. The contactless card 102 may be used in conjunction with a messaging-capable computing device 104. The messaging-capable computing device 104 supports one or more messaging services, such as those described above. The messaging-capable computing device 104 may be a smartphone, a desktop computer, a laptop computer, a tablet computer, a wearable computing device or any computing device that supports the messaging service and that is capable of enabling the initiating party 101 to participate in a secure messaging service as described herein.

As will be described below in more detail, the contactless card 102 may be used in authentication of the initiating party 101 by first interfacing with the messaging-capable computing device 104. The messaging-capable computing device 104 has a near field communication (NFC) reader that can read the contactless card 102 and conduct two-way communications with the contactless card 102. The messaging-capable computing device 104 is interfaced with a network 106. The network 106 may include a wired network and/or a wireless network. The network 106 may include local area networks (LANs) and/or wide area networks (WANs), including the Internet. A server computing device 108 is interfaced with the network 106. The server computing device 108 (e.g., the recipient party) receives the request to initiate a secure messaging system from the initiating party 101 by way of the messaging-capable computing device 104 through the messaging service and is responsible for performing the authentication. The non-initiating party 110 may be a party that has access to the server computing device 108 or may be a client of the server computing device that participates in a chat session using another computing device. The non-initiating party 110 may be a person, a chatbot or an intelligent agent.

Figure 2:
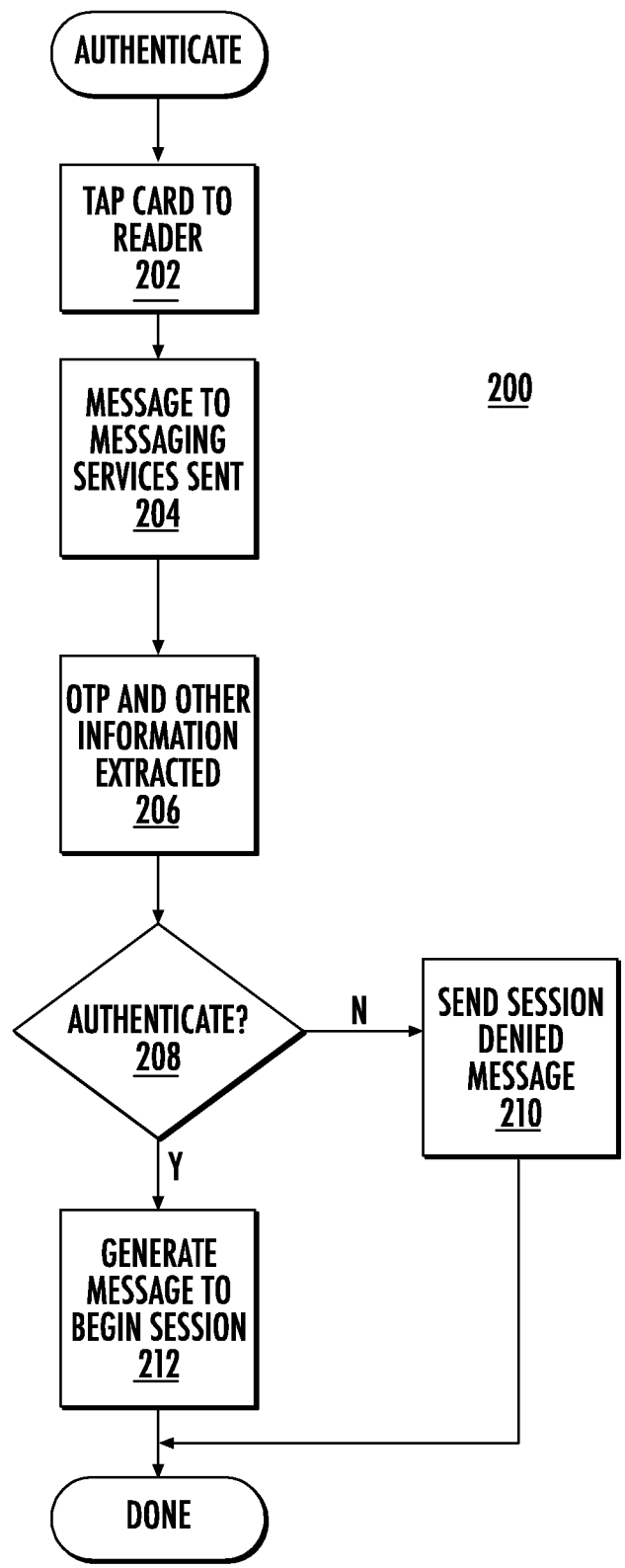
FIG. 2 depicts a flowchart illustrating steps that may be performed to authenticate an initiating party in an exemplary embodiment.
Figure 3:
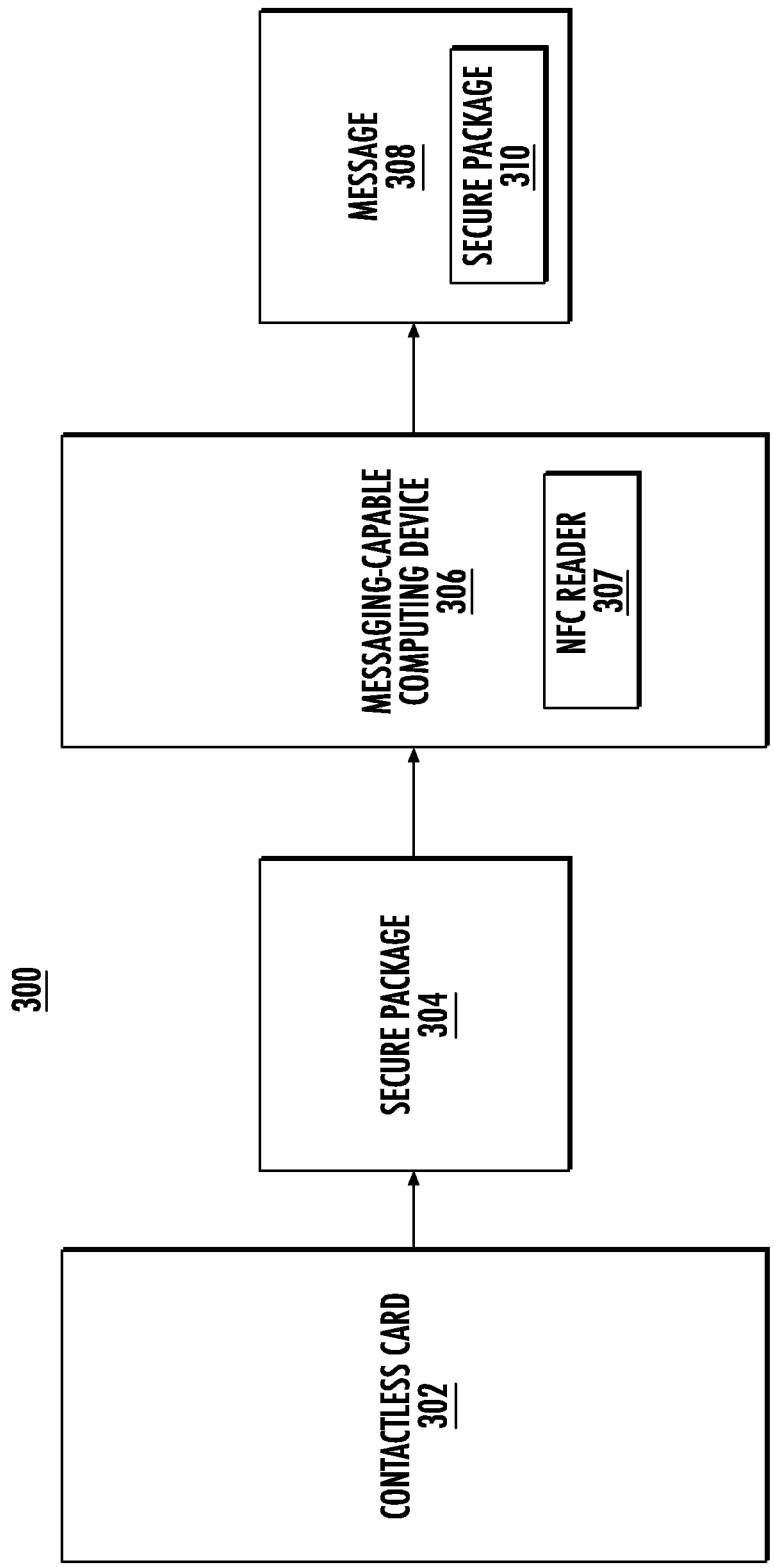
FIG. 3 depicts a block diagram showing the interaction between a contactless card and a messaging-capable device in an exemplary embodiment.
Figure 4:
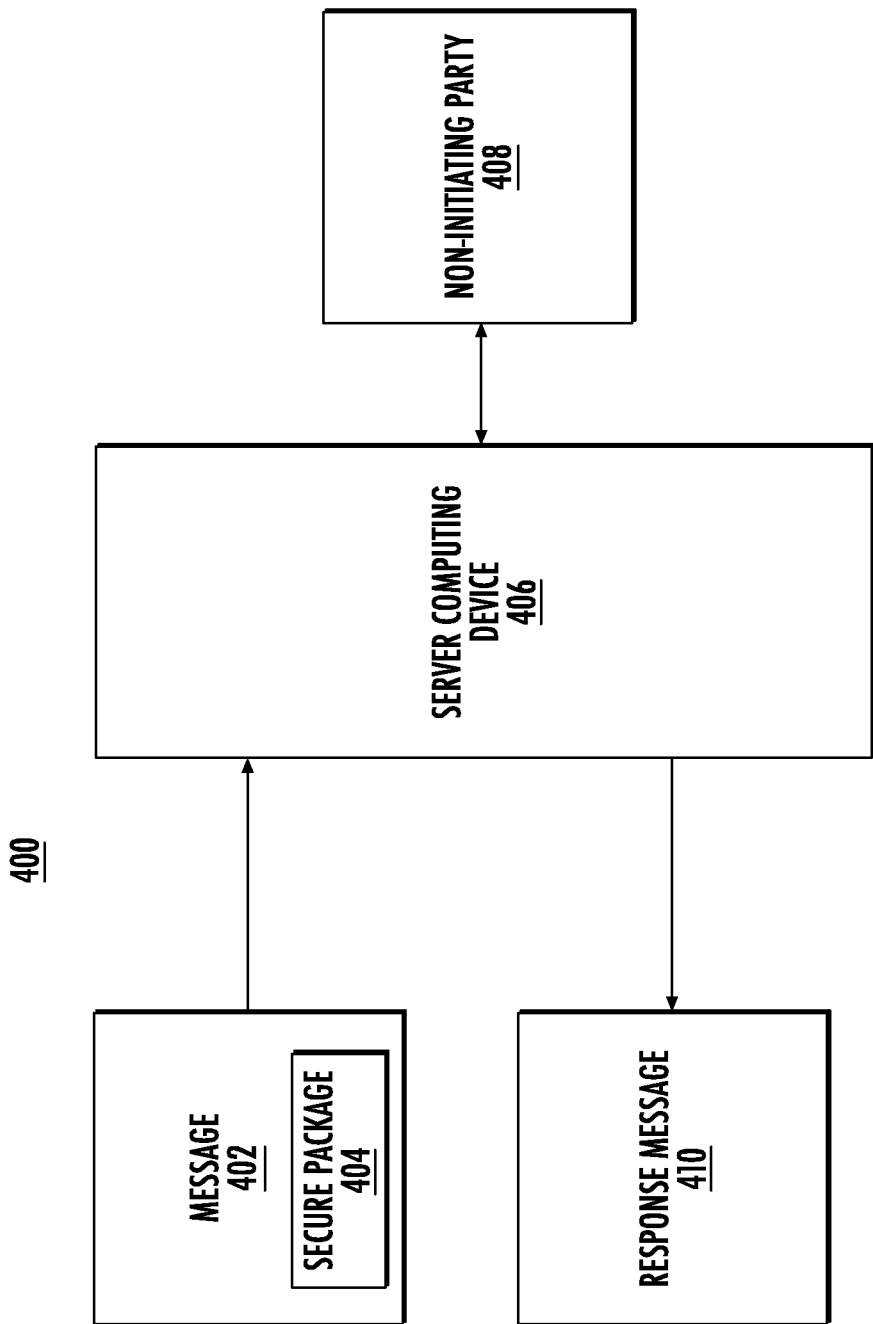
FIG. 4 depicts the flow of messages relative to a server computing device.

FIG. 2 shows a flowchart of the steps that may be performed in an exemplary embodiment to authenticate an initiating party that wishes to initiate a secure messaging service session with a non-initiating party. The steps are described below relative FIGS. 3 and 4. The process may begin with a party tapping a contactless card 302 (see FIG. 3) to a reader 307 in the messaging-capable computing device 306 (202). In some embodiments, the contactless card 302 and the reader 307 communicate via a near field communication (NFC) protocol. The tapping initiates an NFC communication between the contactless card and the reader 307 in the messaging-capable computing device 306. In other instances, the contactless card 302 need not tap the reader 307 but rather may need only be in sufficient proximity to the reader 307 to initiate an NFC communication session. In the NFC communication session, a secure package 304 is sent from the contactless card 302 to the messaging-capable computing device 306 that includes the secure package. The contactless card 302 may via communications prompt an application to be run on the messaging-capable computing device 306 to generate a message to the recipient party. In a direct method, the application is a chat program, such as an SMS messaging application or an application for one of the other varieties of messaging services. As will be described below, the messaging-capable computing device 306 generates an authentication message to attempt to initiate the secure messaging session. In the indirect method, the contactless card 302 provides a uniform resource locator (URL) for a server that includes the phone number for the server that is contacted from the messaging-capable computing device 306 to attempt to initiate the secure messaging service. The messaging-capable computing device 306 generates a message 308 encapsulating the secure package 310 that serves as a request to initiate a secure messaging system that is sent to the server computing device 406 (see FIG. 4) (204).

The request may be sent to the server computing device 406 via the messaging service or via another channel. As was mentioned above, the secure package 310 may include a onetime password and identifying information for the initiating party. The contents will be discussed in more detailed below. The server computing device 406 receives the message 402 and extracts the onetime password and other information (such as identifying information and counter value) from the secure package 404 (206). Based on the extracted information, the server computing device 406 either successfully authenticates the initiating party or does not successfully authenticate the initiating party (208). Where the initiating party is successfully authenticated, a response message 410 from the non-initiating party 408 is sent via the messaging service to the initiating party (212). The response message 410 may inform the initiating party that they have been authenticated or may, for example, simply greet the initiating party and may ask the initiating party what they are contacting the non-initiating party 408 about. Conversely, if the initiating party is not successfully authenticated, a response message 410 denying the request for a secure messaging system is sent to the initiating party (210). In some alternative exemplary embodiments, no message is ever sent back to the initiating party in this case.

Figure 5A:
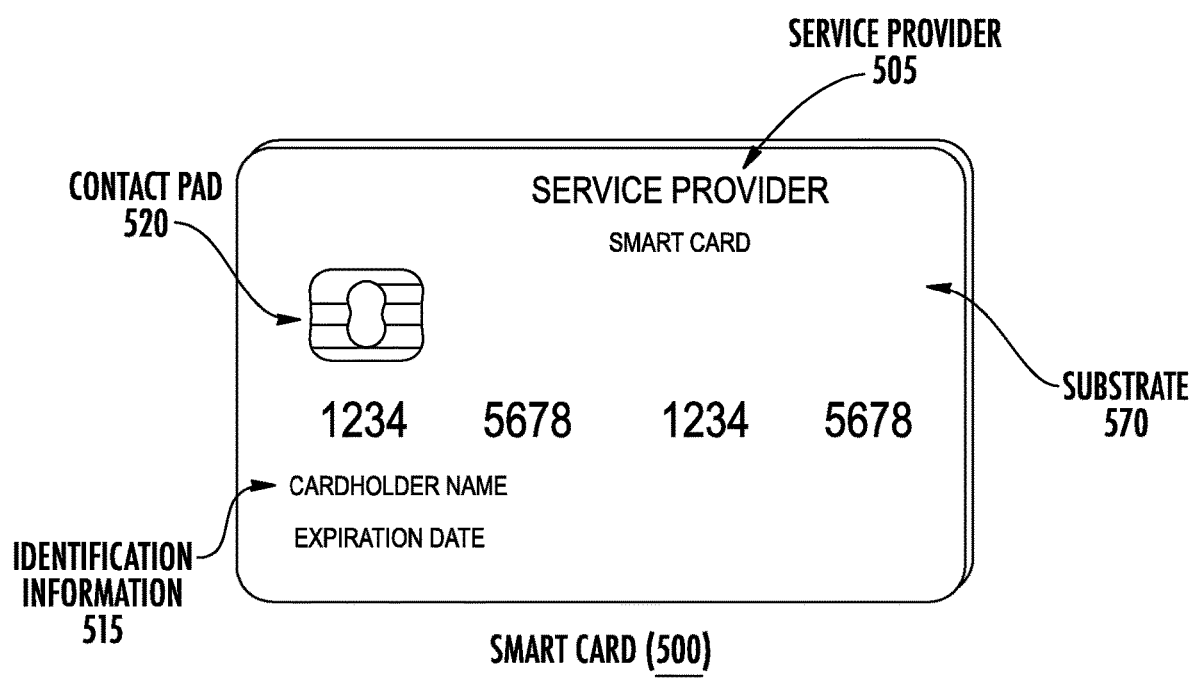
FIG. 5A depicts an illustrative front face of a contactless card.

FIG. 5A illustrates a contactless card 500, which may be a payment card, such as a credit card, a debit card, or a gift card, issued by a service provider 505 displayed on the front or back of the card 500. In some exemplary embodiments, the contactless card 500 is not related to a payment card, and may comprise, without limitation, an identification card. In some instances, the payment card may comprise a dual interface contactless payment card. The contactless card 500 may comprise a substrate 510, which may include a single layer or laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 500 may have physical characteristics compliant with the ID-1 format of the ISO/IEC 7810 standard, and the contactless card 500 may otherwise be compliant with the ISO/IEC 14443 standard. However, it is understood that the contactless card 500 according to the present disclosure may have different characteristics, and the present disclosure does not require a contactless card to be implemented in a payment card.

The contactless card 500 may also include identification information 515 displayed on the front and/or back of the card, and a contact pad 520. The contact pad 520 may be configured to establish contact with another communication device, such as a user device, smart phone, laptop, desktop, or tablet computer. The contactless card 500 may also include processing circuitry, antenna and other components not shown in FIG. 5A. These components may be located behind the contact pad 520 or elsewhere on the substrate 510. The contactless card 500 may also include a magnetic strip or tape, which may be located on the back of the card (not shown in FIG. 5A).

Figure 5B:
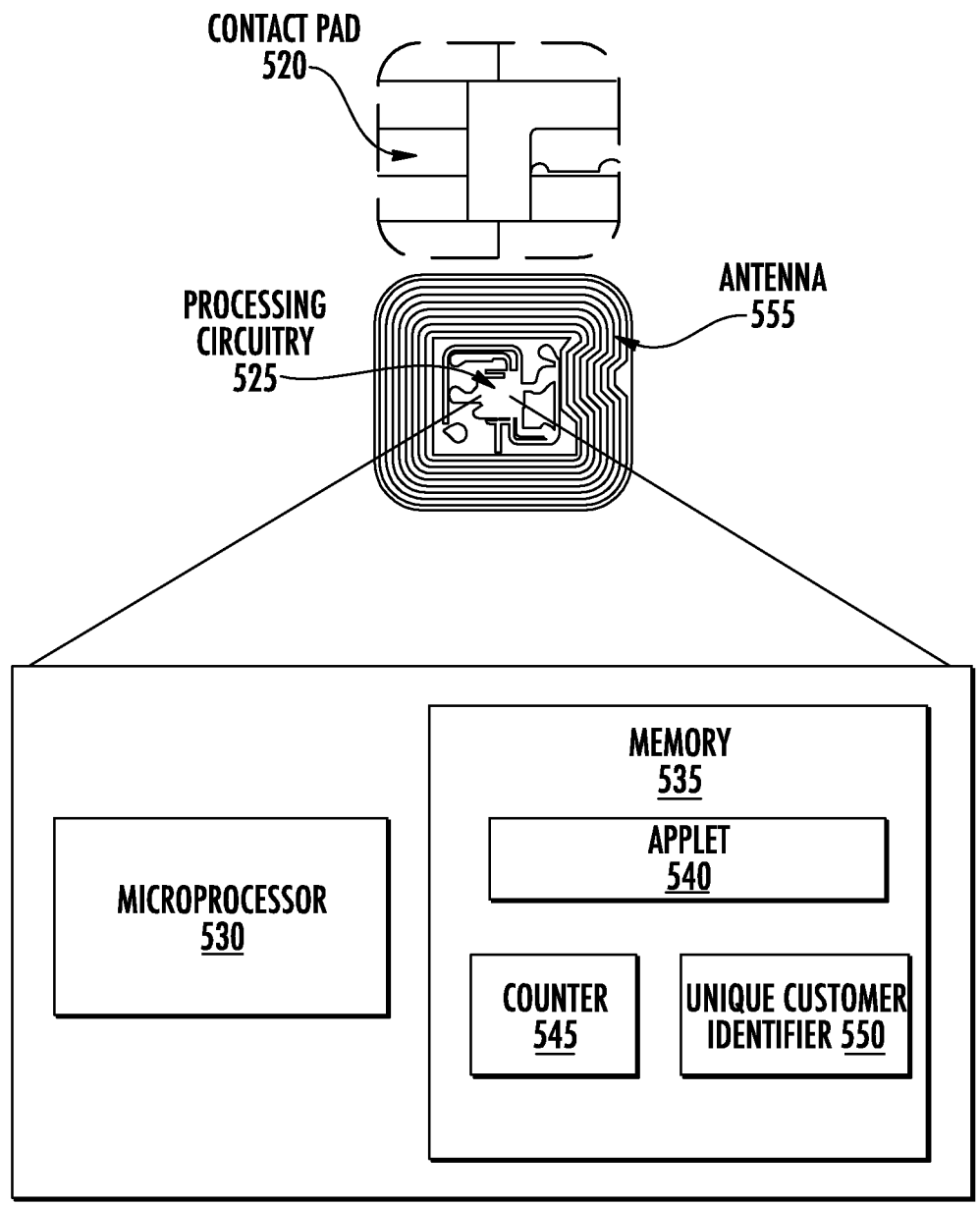
FIG. 5B depicts hardware components of a contactless card.

As illustrated in FIG. 5B, the contact pad 520 of FIG. 5A may include processing circuitry 525 for storing and processing information, including a microprocessor 530 and a memory 535. It is understood that the processing circuitry 525 may contain additional components, including processors, memories, error and parity/CRC checkers, data encoders, anti-collision algorithms, controllers, command decoders, security primitives and tamper proofing hardware, as necessary to perform the functions described herein.

The memory 535 may be a read-only memory, write-once read-multiple memory or read/write memory, e.g., RAM, ROM, and EEPROM, and the contactless card 500 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 535 may be configured to store one or more applets 540, one or more counters 545, and a customer identifier 550. The one or more applets 540 may comprise one or more software applications configured to execute on one or more contactless cards, such as Java Card applet. However, it is understood that applets 540 are not limited to Java Card applets, and instead may be any software application operable on contactless cards or other devices having limited memory. The one or more counters 545 may comprise a numeric counter sufficient to store an integer. The customer identifier 550 may comprise a unique alphanumeric identifier assigned to a user of the contactless card 500, and the identifier may distinguish the user of the contactless card from other contactless card users. In some examples, the customer identifier 550 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 520 or entirely separate from it, or as further elements in addition to processor 530 and memory 535 elements located within the contact pad 520.

In some examples, the contactless card 500 may comprise one or more antennas 555. The one or more antennas 555 may be placed within the contactless card 500 and around the processing circuitry 525 of the contact pad 520. For example, the one or more antennas 555 may be integral with the processing circuitry 525 and the one or more antennas 555 may be used with an external booster coil. As another example, the one or more antennas 555 may be external to the contact pad 520 and the processing circuitry 525.

In an embodiment, the coil of contactless card 500 may act as the secondary of an air core transformer. The terminal may communicate with the contactless card 500 by cutting power or amplitude modulation. The contactless card 500 may infer the data transmitted from the terminal using the gaps in the contactless card's power connection, which may be functionally maintained through one or more capacitors. The contactless card 500 may communicate back by switching a load on the contactless card's coil or load modulation. Load modulation may be detected in the terminal's coil through interference.

As explained above, the contactless card 500 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

Figure 5C:
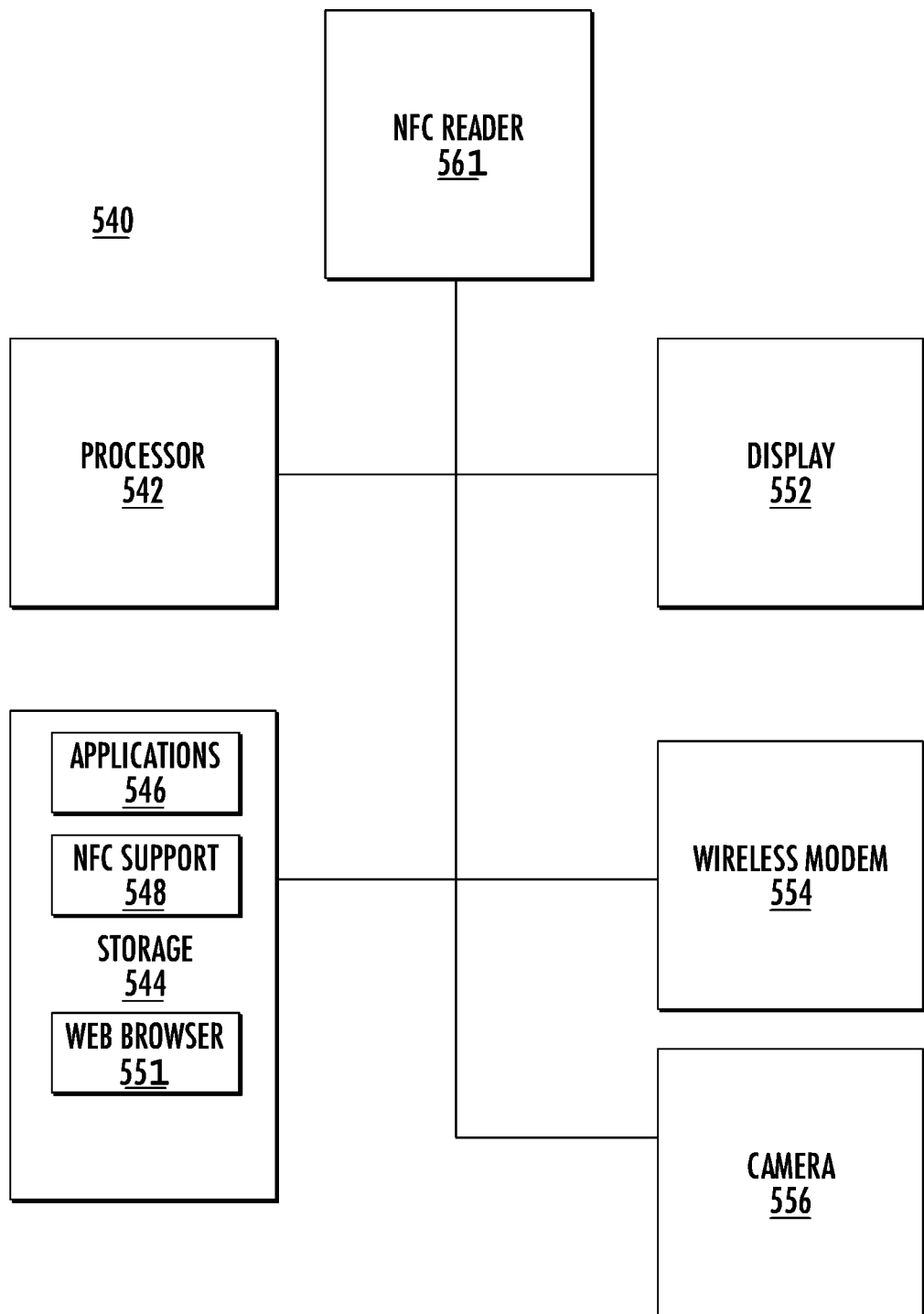
FIG. 5C depicts a block diagram of messaging-capable computing device.

FIG. 5C depicts a block diagram showing illustrative components of messaging-capable computing device 540. The messaging-capable computing device 540 may include a processor 542. The processor 542 may be a microprocessor, such as a central processing unit (CPU), a graphics processing unit (GPU), etc. The processor 542 may be realized as a field programmable gate array (FPGA), an application specific integrated circuit (ASIC), a controller, electric circuitry or the like that provides the functionality described herein for the processor of the messaging-capable computing device 540. The messaging-capable computing device 540 may include a storage 544. The storage 544 may include volatile memory and/or non-volatile memory. The storage 544 may include optical and/or magnetic storage devices and may include non-transitory computer-readable storage media storing instructions for execution by the processor 542. The storage 544 may include magnetic disk drives, optical disk drives, solid state storage, read only memory, random access memory, flash memory and the like. In the depiction of FIG. 5C, the storage 544 stores application programs 546, such as messaging applications or applications for providing functionality described herein. The storage 544 may also store computer-executable instructions that provide proximity protocol support 208 for NFC communications. In addition, the storage 544 may store a web browser 551 for facilitating web access. It will be appreciated that the storage 204 may store other programs and data that are not depicted.

The messaging-capable computing device 540 may include an NFC reader 561, for participating in NFC communications. The messaging-capable computing device 540 may additionally include a display device 552, such as a light emitting diode (LED) display, a liquid crystal display (LCD) or a retinal display. The messaging-capable computing device 540 may include a wireless modem 554 for enabling communication over a wireless network, such as a cellular phone network. The messaging-capable computing device 540 may include a camera 556 for capturing images and/or video. The camera 556 may also be used in scanning optical codes.

Figure 5D:
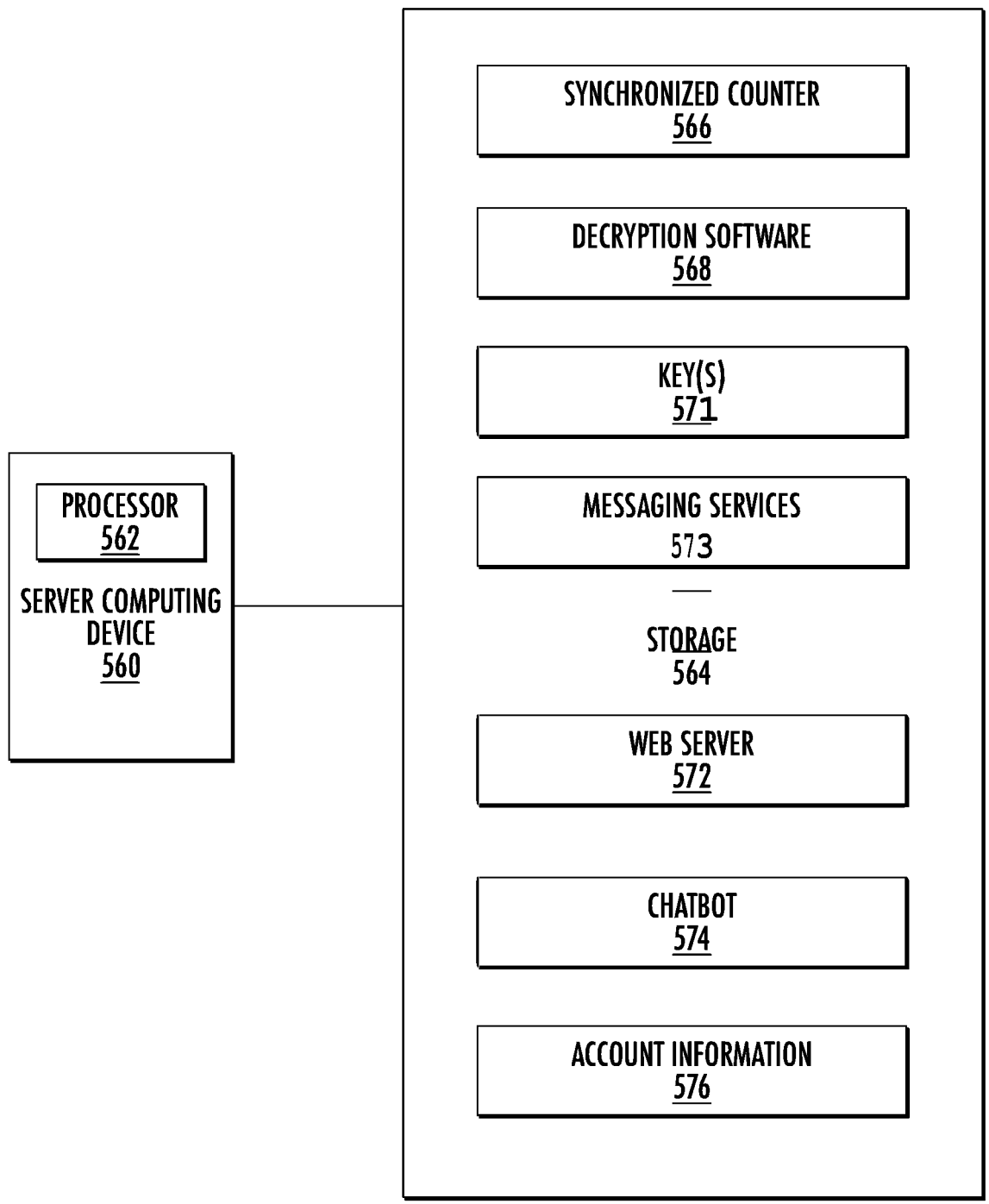
FIG. 5D depicts a block diagram of a server computing device and storage.

FIG. 5D depicts a block diagram of a server computing device 560. The server computing device 560 may take many forms, including but not limited to a desktop computer, a workstation or a server. The server computing device 560 may include a processor 562. The processor 562 may take any of multiple forms like those discussed relative to the messaging-capable computing device of FIG. 5C. The server computing device 560 may include or have access to a storage 564. The storage 564 may include the various forms of storage that were discussed relative to the messaging-capable computing device of FIG. 5C. The storage 564 may hold programs, applets, and/or executable code that may be executed by the processor 562. For example, the storage may store a synchronized counter 566 as is discussed below. The storage 564 may also store decryption software 568 for decrypting the secure package and the hashed content and encryption/decryption keys 571. The storage 564 may store messaging services software 573 for the secure messaging service. The storage 564 may store software for a web server 572 and a chatbot 574. The storage 564 may store account information 576 for clients or customers. This account information 576 may be stored in databases in some exemplary embodiments.

Generally, the server computing device 560 (or another computing device) and the contactless card 500 may be provisioned with the same master key (also referred to as a master symmetric key). More specifically, each contactless card 500 is programmed with a distinct master key that has a corresponding pair in the server computing device 560. For example, when a contactless card 500 is manufactured, a unique master key may be programmed into the memory 535 of the contactless card 500. Similarly, the unique master key may be stored in a record of a customer associated with the contactless card 500 in the account information 576 of the server computing device 560 (and/or stored in a different secure location). The master key may be kept secret from all parties other than the contactless card 500 and server computing device 560, thereby enhancing security of the system.

The master keys may be used in conjunction with the counters 104 to enhance security using key diversification. The counters 545 and 566 comprise values that are synchronized between the contactless card 500 and server computing device 560. The counter value may comprise a number that changes each time data is exchanged between the contactless card 500 and the server computing device 560 (and/or the contactless card 500 and the messaging-capable computing device 540). To enable NFC data transfer between the contactless card 500 and the messaging-capable computing device 540, an application 546 may communicate with the contactless card 500 when the contactless card 500 is sufficiently close to NFC reader 561 of the messaging-capable computing device 540. NFC reader 561 may be configured to read from and/or communicate with contactless card 500.

For example, a user may tap the contactless card 500 to the messaging-capable computing device 540, thereby bringing the contactless card 500 sufficiently close to the NFC reader 561 of the messaging-capable computing device 540 to enable NFC data transfer between the messaging-capable computing device 540 may trigger the NFC reader 561 via an API call. In addition and/or alternatively, the messaging-capable computing device 540 may trigger the NFC reader 561 based on periodically polling the NFC reader 561. More generally, the messaging-capable computing device 540 may trigger the NFC reader 561 to engage in communications using any feasible method. After communication has been established between messaging-capable computing device 540 and the contactless card 500, the contactless card 500 may generate a message authentication code (MAC) cryptogram. In some examples, this may occur when the contactless card 500 is read by the application 546. In particular, this may occur upon a read, such as an NFC read, of a near field data exchange (NDEF) tag, which may be created in accordance with the NFC Data Exchange Format. For example, a reader, such as the application 546 and/or the NFC reader 561, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, the counter value maintained by the contactless card 500 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In some examples, the MAC cryptogram may be transmitted as an NDEF tag, and in other examples the MAC cryptogram may be included with a uniform resource indicator (e.g., as a formatted string). The contactless card 500 may then transmit the MAC cryptogram to the messaging-capable computing device 540, which may then forward the MAC cryptogram to the server computing device 560 for verification as explained below. However, in some embodiments, the messaging-capable computing device 540 may verify the MAC cryptogram.

More generally, when preparing to send data (e.g., to the server 560 and/or the messaging-capable computing device 540), the contactless card 540 may increment the counter 545. The contactless card 500 may then provide the master key and counter value as input to a cryptographic algorithm, which produces a diversified key as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 500 may then encrypt the data (e.g., the customer identifier 107 and any other data) using the diversified key. The contactless card 500 may then transmit the encrypted data to the application 546 of the messaging-capable computing device 546 (e.g., via an NFC connection, Bluetooth connection, etc.). The application 546 of the messaging-capable computing device 540 may then transmit the encrypted data to the server computing device 560 via the network 106. In at least one embodiment, the contactless card 500 transmits the counter value with the encrypted data. In such embodiments, the contactless card 500 may transmit an encrypted counter value, or an unencrypted counter value.

Although the counter is used as an example, other data may be used to secure communications between the contactless card 500, the messaging-capable computing device 540, and/or the server computing device 560. For example, the counter may be replaced with a random nonce, generated each time a new diversified key is needed, the full value of a counter value sent from the contactless card 500 and the server computing device 560, a portion of a counter value sent from the contactless card 500 and the server computing device 560, a counter independently maintained by the contactless card 500 and the server computing device 560 but not sent between the two, a one-time-passcode exchanged between the contactless card 500 and the server computing device 560, and a cryptographic hash of data. In some examples, one or more portions of the diversified key may be used by the parties to create multiple diversified keys.

Figure 6A:
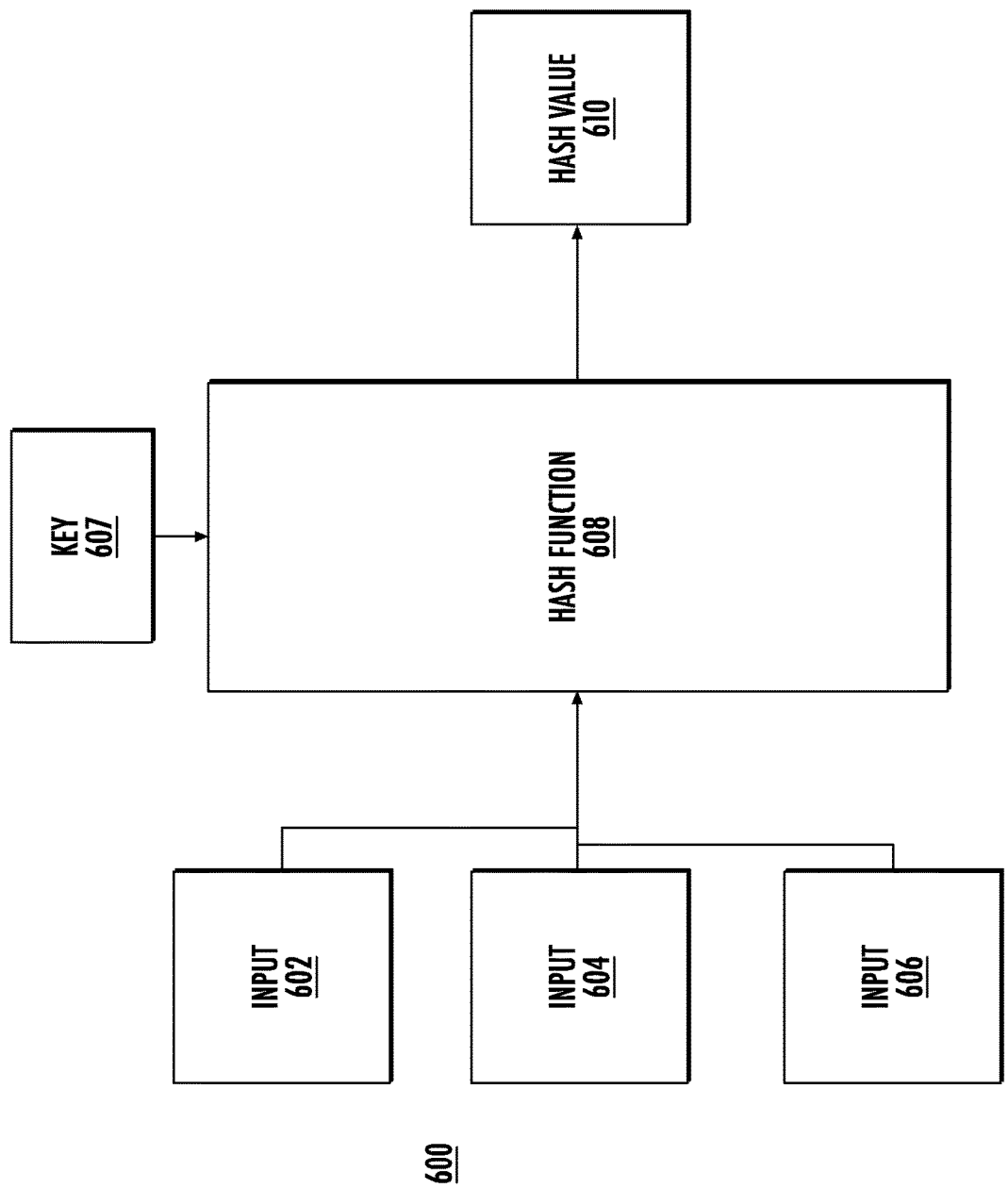
FIG. 6A depicts a diagram illustrating the hashing of inputs to produce a hash value.

The generation of the secure package 404 (FIG. 4) may employ cryptographic hash functions, such as MD5 or SHA-1. FIG. 6A shows a block diagram 600 depicting how the cryptographic hash functions may be used in exemplary embodiments. In the example shown in FIG. 6A, three inputs 602, 604 and 606 are passed through a hash function 608 together. The choice of depicting three inputs is intended to be illustrative and not limiting. Other number of inputs may be used in some instances. The hash function 608 produces an output hash value 610. Due to the nature of the hash function 608, it is computationally difficult to derive the inputs 602, 604 and 606 from the hash value 610 without knowing the key 607 used by the hash function 608. The key 609 is kept secret. The key 607 may be dynamically generated for each session and may be particular to the contactless card. Thus, the hash function 608 provides a layer of security for the content (e.g., inputs 602, 604 and 606) that is included in the secure package 404.

Figure 6B:
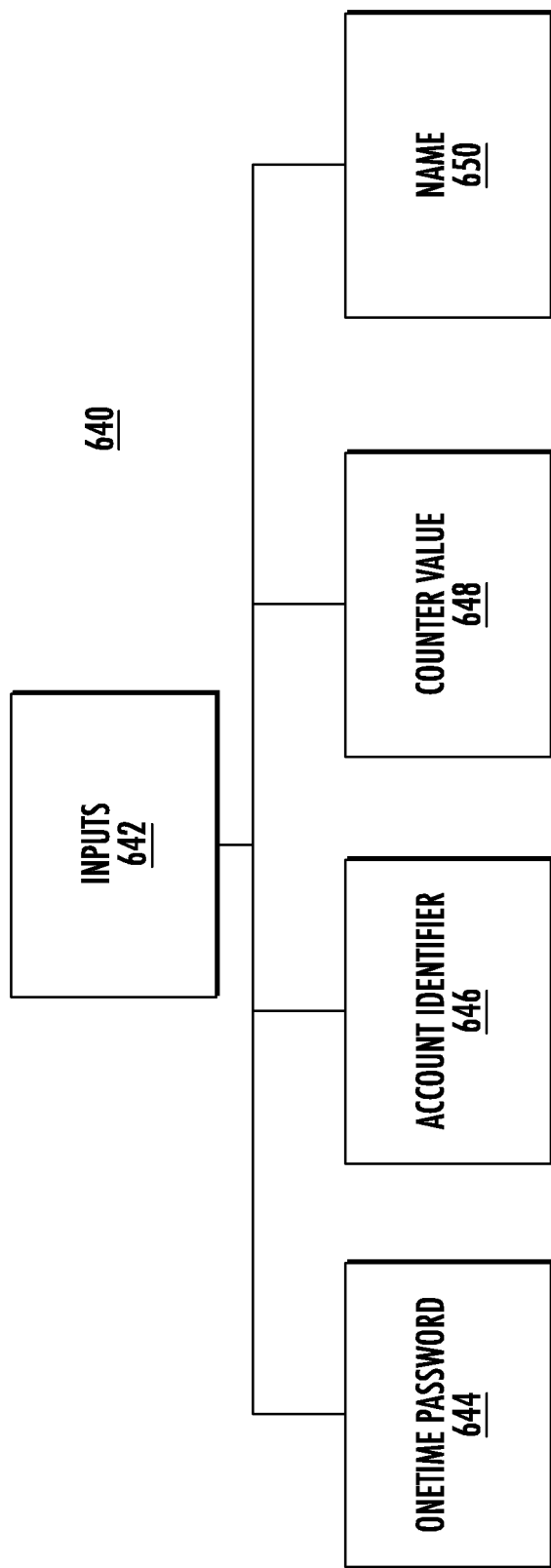
FIG. 6B depicts different types of inputs to the hash function.

In the exemplary embodiments, the inputs 602, 604 and 606 may vary depending on the information the parties wish to exchange and the protocol for authenticating the initiating party. FIG. 6B, shows a diagram 640 of possible types of inputs 642 that may be hashed in exemplary embodiments. In these exemplary embodiments, a onetime password 644 generated by the contactless card may be included as an input. An account identifier 646 for the initiating party may be provided. This may be an account number or other identifier that uniquely identifies the account of the initiating party. As was described above, the account identifier may be a phone number for the initiating party. In some cases, the phone number of the initiating party may not be included in the hash value 610 but may be derived from the message sent from the messaging-capable computing device 540. The inputs 642 may include a name 650 of the initiating party.

As an added layer of security, the hash value 610 may be encrypted. FIG. 7 shows a block diagram 700 depicting such encryption. The hash value 702 generated as discussed above is passed to an encryption engine 704 that encrypts the hash value using an encryption key 706. The resulting output is the secure package 708. The encryption engine 704 may use any of a number of cryptographic algorithms, such as DES, AES, RSA, DSA or the like. These may be symmetric cryptographic algorithms like DES and AES or asymmetric cryptographic algorithms like RSA and DSA. It is presumed that the server computing device 406 (FIG. 4) possesses the appropriate key to decrypt the secure package. Although not shown in FIG. 7, other content may be encrypted in conjunction with the hash value 702.

Figure 8:
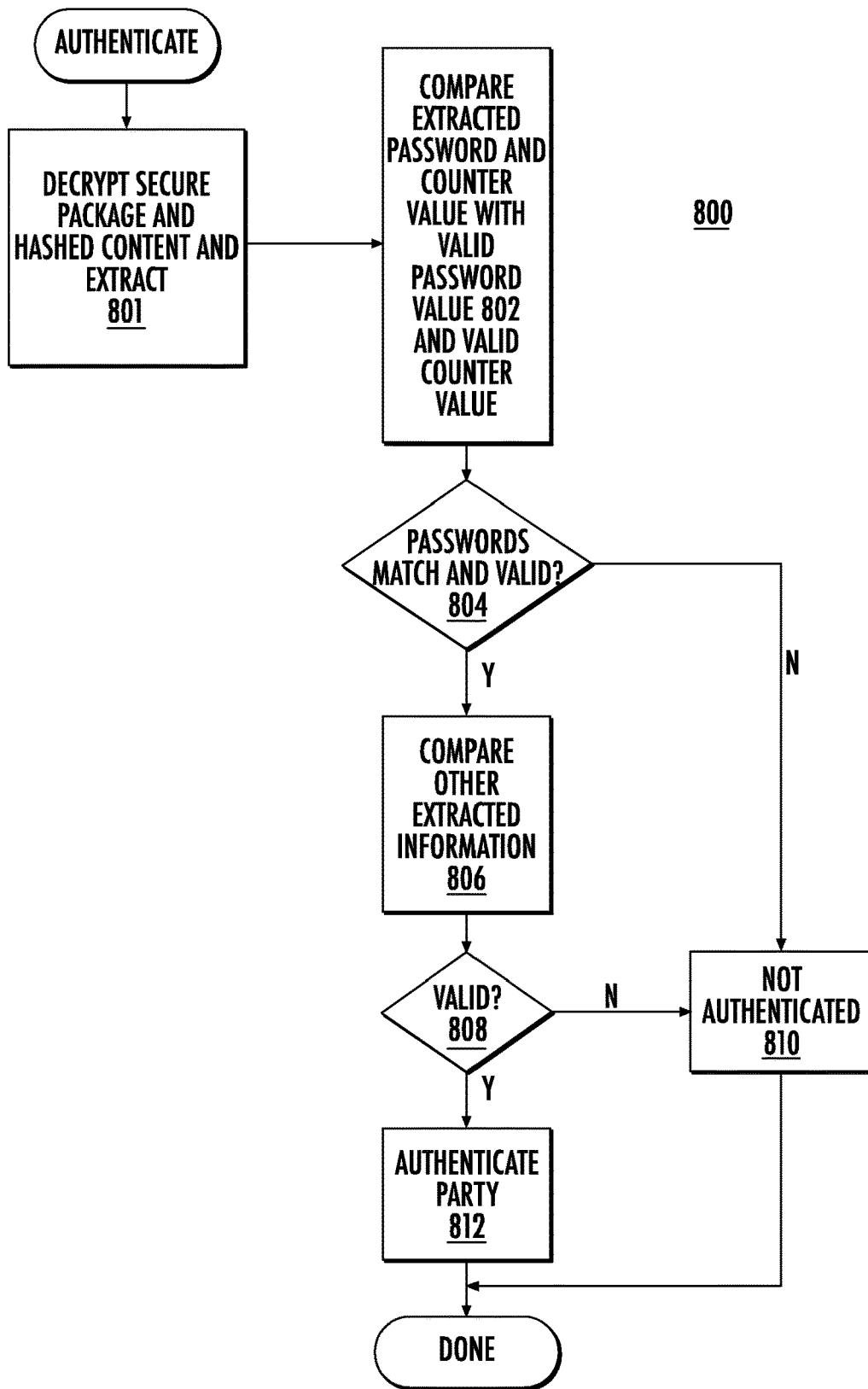
FIG. 8 depicts a flowchart illustrating steps that may be performed to authenticate an initiating party.

FIG. 8 depicts a flowchart 800 of steps performed to authenticate the initiating party once the authentication message with the secure package has been received by the server computing device as the recipient party. Initially, the server computing device uses the decryption keys to decrypt the secure package. In addition, the decryption keys are used to decrypt the hash to extract the inputs that were hashed together by the hash function (801). The extracted password and counter value may be compared with the valid password and valid counter value (802). A determination is made whether the passwords match and the counter values match or if the extracted counter value otherwise indicates that the password has not expired (804). If the passwords match and the extracted password has not expired based on the extracted counter value, other extracted information may be compared (806).

Figure 9:
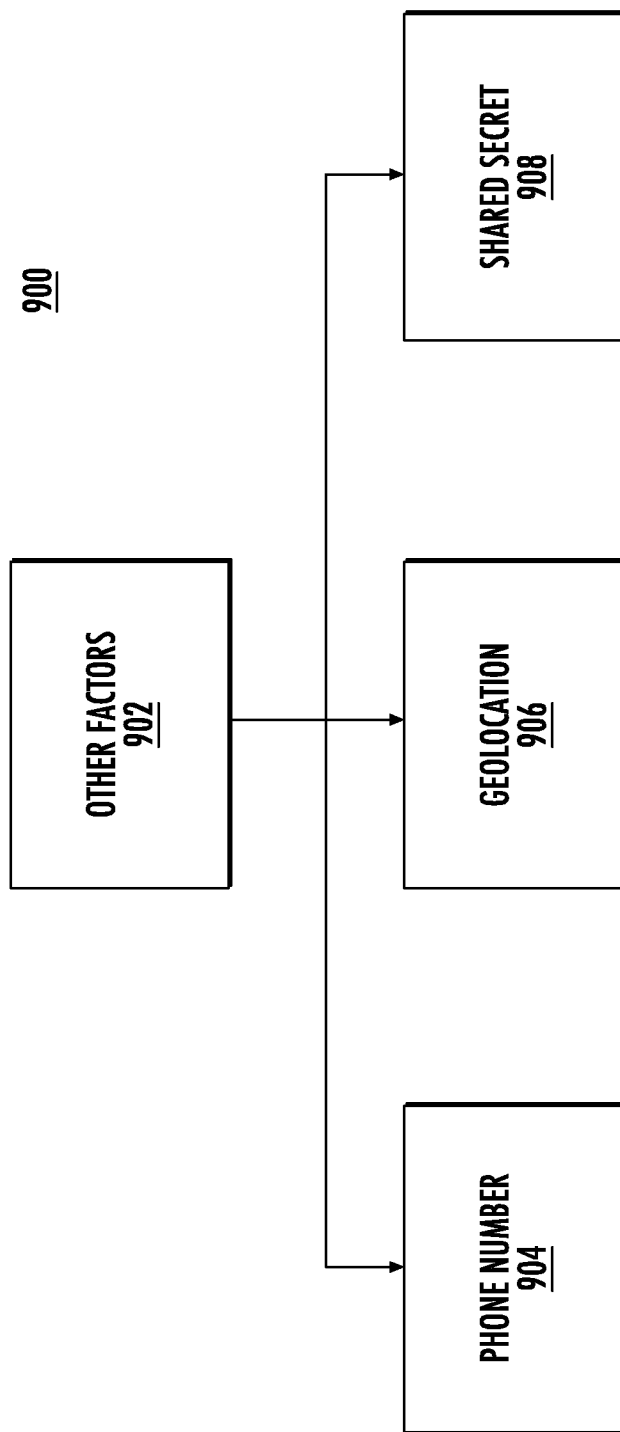
FIG. 9 depicts other types of authentication factors.

The other information may be other authentication factors 902, such as depicted in diagram 900 of FIG. 9. The other authentication factors 902 may include the phone number of the messaging-capable computing device, which may be compared to the phone number on record for the initiating party. The other authentication factors 902 may include a geolocation 906 for the initiating party. The geolocation 906 may be information such as GPS information or area code and exchange prefix information that may be compared with information regarding the residence of the party. The other authentication factors 902 may include a shared secret that is shared between an authenticated party and the server computing device.

If the other information is valid (808), then the initiating party may be authenticated (812). If not, the initiating party is not authenticated (810). Similarly, if the passwords do not match or the password has expired as indicated by the extracted counter value, the initiating party is not authenticated (810).

While the present invention has been described with reference to exemplary embodiments herein, it will be appreciated that various changes in scope and detail may be made without departing from the intended scope as defined in the appended claims.

The invention claimed is:

1. A computing device implemented method, comprising:
receiving a message at a computing device from a Short Message Service (SMS) capable device have an associated phone number, wherein the message indicates a desire to initiate an SMS session and wherein the message includes a secure component;
decrypting the secure component to obtain a hash of at least a onetime password and an account identifier;
extracting the onetime password and the account identifier;
determining if the onetime password is valid;
determining what account is associated with the account identifier;
accessing what phone number is connected with the determined account;
determining if the associated phone number is a matching phone number that matches the phone number connected with the account;
where the password is valid and the associated phone number is a matching phone number, initiating a secure SMS session by sending an SMS message to the SMS capable device; and
where the password is not valid and/or the associated password is not a matching phone number, rejecting initiation of the secure SMS session with the SMS capable device;
wherein the computing device maintains a counter and wherein the computing device uses a value of the counter in determining whether a password has expired; and
wherein the counter maintained by the computing device is in synch with a counter maintained by the contactless card.

2. The method of claim 1, wherein the decrypting uses a symmetric decryption algorithm.

3. The method of claim 1, further comprising:
checking a geolocation of the SMS-capable device; and
using the geolocation as another authentication factor in determining whether or not to initiate the secure SMS session.

4. The method of claim 1, wherein the receiving the message comprises receiving an SMS message.

5. The method of claim 1, further comprising where the secure SMS session is initiated, using a chatbot to participate in the secure SMS session.

6. The method of claim 1, wherein the onetime password is a time-based password.

7. A Short Message Service (SMS) capable device-implemented method, comprising:
receiving a cryptographically secure onetime password from a contactless card at the SMS capable device via a near field communication, wherein:
the cryptographically secure onetime password comprises an encrypted hash of at least the onetime password and an account identifier,
the onetime password is encrypted by a symmetric encryption algorithm, and
the onetime password is valid for only a set period of time;
sending a message from the SMS capable device to a party to request initiation of a secure SMS session, wherein the message includes the cryptographically secure onetime password and wherein the SMS capable device has an associated phone number; and
where the password is valid and where the phone number of the SMS capable device is associated with an account identified by the account identifier, receiving an SMS message from the party at the SMS capable device;
wherein the sending the message from the SMS capable device comprises one of sending the message to a website for the party or sending the message directly to the party.

8. The method of claim 7, wherein the sending the message from the SMS capable device comprises sending an initial SMS message.

9. The method of claim 7, further comprising sending geolocation information from the SMS capable device to the party.

10. The method of claim 7, wherein the SMS message is received from a chatbot.

11. A method performed by a contactless card, comprising:
initiating a near field communication (NFC) session with a computing device; as part of the NFC session,
communicating with an application program running on the computing device;
passing at least a onetime password and an account identifier through a hash function to create a hash value;
encrypting the hash value;
passing the encrypted hash value to the application running on the computing device; and prompting the application to send a message to a remote computing device to initiate a messaging session with the remote computing device where the message includes the encrypted hash value as evidence of an identity of a party that wishes to initiate the messaging session;

wherein the onetime password is a time-based password;

wherein the contactless card maintains a counter and a value of the counter is used in creating the encrypted hash value;

where the value of the counter is passed through the hash function; and wherein the value of the counter is passed through the hash function along with the onetime password and the account identifier.

12. The method of claim 11, wherein the onetime password is valid only for a set period of time.

13. The method of claim 11, wherein the NFC session is initiated responsive to tapping the contactless card on a card reader in the computing device.

* * * * *